US00RE37074E

(19) United States
(12) Reissued Patent
Danby et al.

(10) Patent Number: US RE37,074 E
(45) Date of Reissued Patent: Feb. 27, 2001

(54) PUMPING DEVICE HAVING INLET AND OUTLET VALVES ADJACENT OPPOSED SIDES OF A TUBE DEFORMING DEVICE

(75) Inventors: Hal C. Danby, Sudbury; Eric A. Faulkner, Maidenhead, both of (GB)

(73) Assignee: Baxter Intl. Inc., Deerfield, IL (US)

(21) Appl. No.: 08/314,345

(22) Filed: Sep. 28, 1994

Related U.S. Patent Documents

Reissue of:
(64) Patent No.: 5,151,019
Issued: Sep. 29, 1992
Appl. No.: 07/430,851
Filed: Nov. 2, 1989

(30) Foreign Application Priority Data

Nov. 4, 1988 (GB) ..... 8825816

(51) Int. Cl.[7] ..... F04B 43/12
(52) U.S. Cl. ..... 417/474; 417/478; 417/479; 251/9
(58) Field of Search ..... 417/474, 478, 417/479, 475; 251/9, 10

(56) References Cited

U.S. PATENT DOCUMENTS

| | | | |
|---|---|---|---|
| 1,988,624 | 1/1935 | Kipp . | |
| 2,393,838 | 1/1946 | Tarbox . | |
| 2,412,397 | 12/1946 | Harper | 417/474 |
| 3,083,647 | 4/1963 | Muller . | |
| 3,171,360 | 3/1965 | Walton . | |
| 3,215,394 | 11/1965 | Sherman | 251/4 |
| 3,518,033 | 6/1970 | Anderson . | |
| 3,606,596 | 9/1971 | Edwards | 417/474 X |
| 3,918,854 | 11/1975 | Catarious et al. | 417/477 |
| 3,951,571 | 4/1976 | Jung | 417/478 X |
| 4,014,318 | 3/1977 | Dockum . | |
| 4,199,307 | 4/1980 | Jassawalla . | |
| 4,302,164 | 11/1981 | Manella | 417/474 |
| 4,382,753 | 5/1983 | Archibald | 417/477 |
| 4,479,797 | 10/1984 | Kobayashi et al. | 417/474 X |
| 4,501,405 | 2/1985 | Usry | 417/478 X |
| 4,549,860 | 10/1985 | Yakich | 417/477 X |
| 4,558,989 | 12/1985 | Chappell | 417/478 X |
| 4,559,038 | 12/1985 | Berg et al. | 417/474 X |
| 4,781,548 | 11/1988 | Alderson et al. | 417/474 |
| 4,821,996 | 4/1989 | Bellotti . | |
| 4,890,984 | 1/1990 | Alderson | 417/479 X |
| 4,893,991 | 1/1990 | Hemingway et al. | 417/474 X |
| 4,909,710 | 3/1990 | Kaplan et al. | 417/474 X |
| 4,936,760 | 6/1990 | Williams | 417/479 |
| 5,000,419 | 3/1991 | Palmer . | |
| 5,039,279 | 8/1991 | Natwick . | |
| 5,055,013 | 10/1991 | Faeser . | |
| 5,116,203 | 5/1992 | Natwick . | |
| 5,158,437 | 10/1992 | Natwick . | |

FOREIGN PATENT DOCUMENTS

| | | |
|---|---|---|
| 650042 | 2/1951 | (GB) . |
| 804536 | 11/1958 | (GB) . |
| 2000833 | 1/1979 | (GB) . |
| 2065789 | 7/1981 | (GB) . |
| 2150644 | 7/1985 | (GB) . |

*Primary Examiner*—Charles G. Freay
(74) *Attorney, Agent, or Firm*—Paul E. Schaatsma; Francis C. Konalik

(57) ABSTRACT

A pumping device controlling an amount of liquid passing through a length of tubing accommodated in the pumping device. The pumping device includes inlet and outlet valves located adjacent opposed sides of a tube deforming device. The valves are controllable for restricting the flow of liquid through the tubing, and the deforming device is such that the tubing is first deformed in one direction and then in another direction which tends to restore the original cross-sectional shape of the tubing.

36 Claims, 7 Drawing Sheets

FIG.3a.
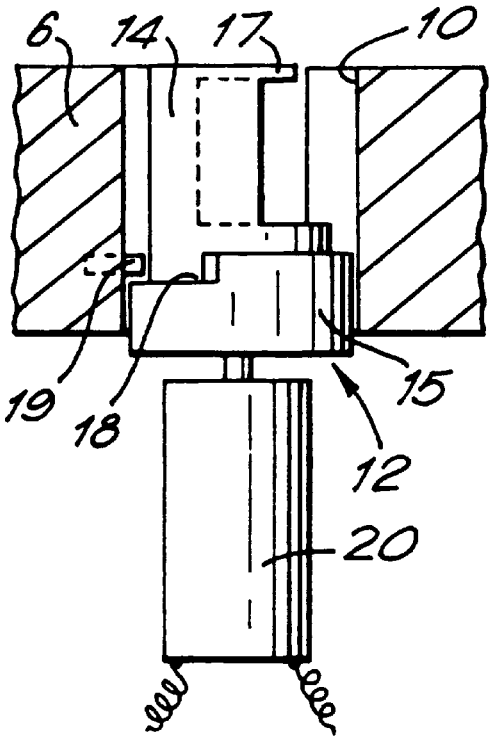
FIG.3b.
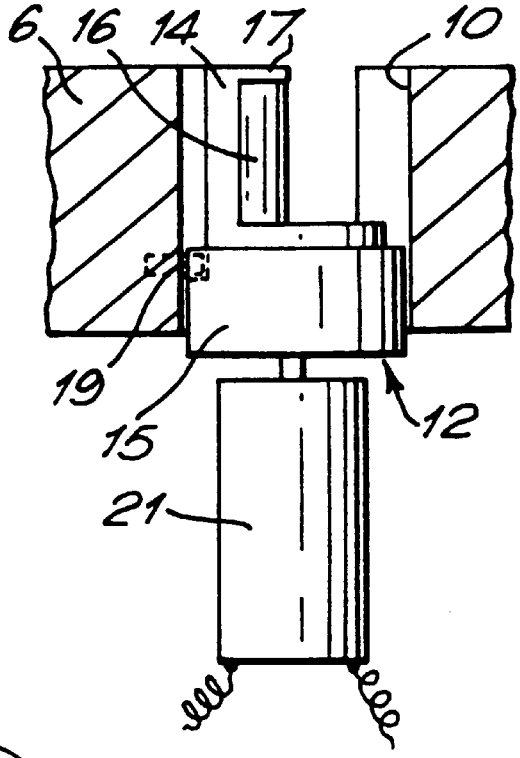
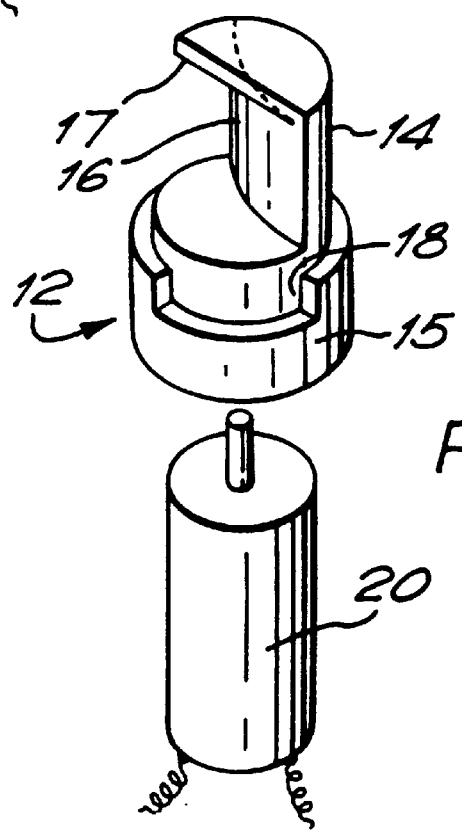
FIG.3c.

FIG. 4a.
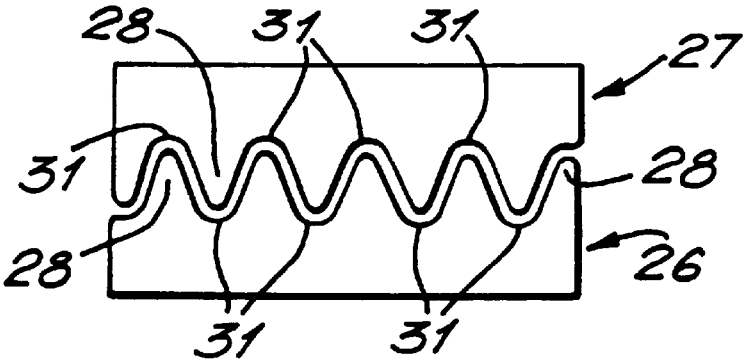
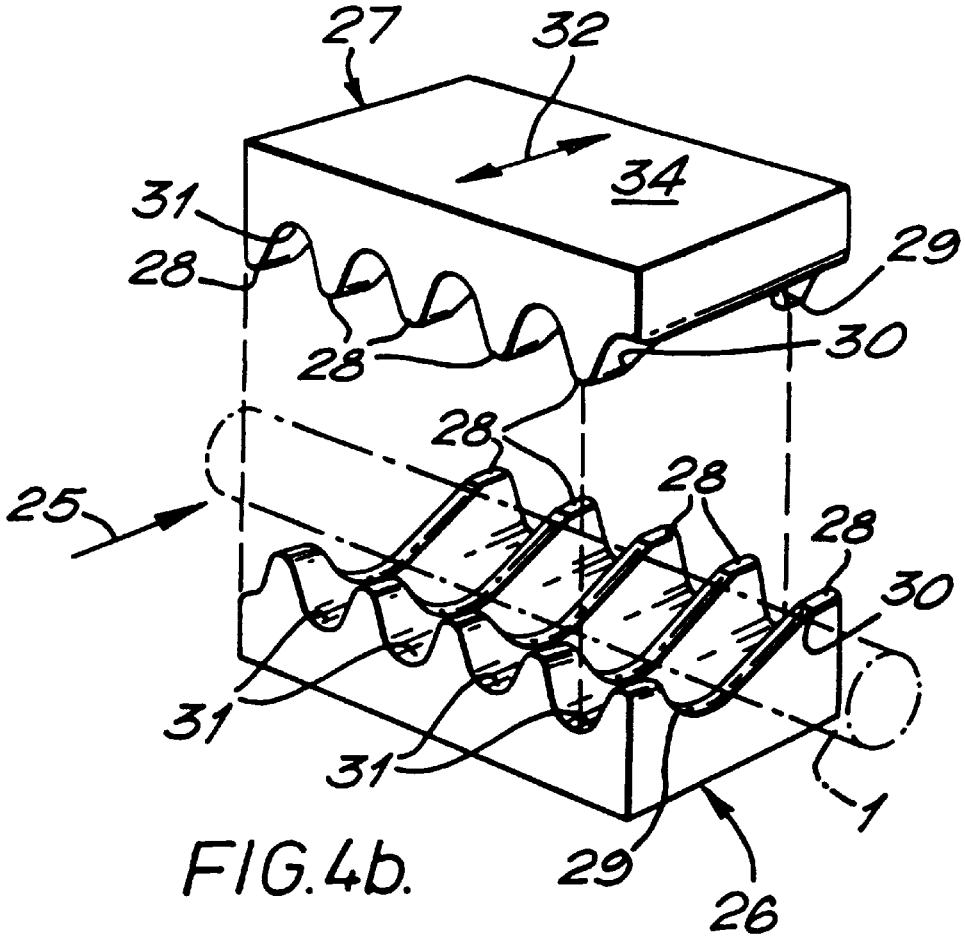
FIG. 4b.

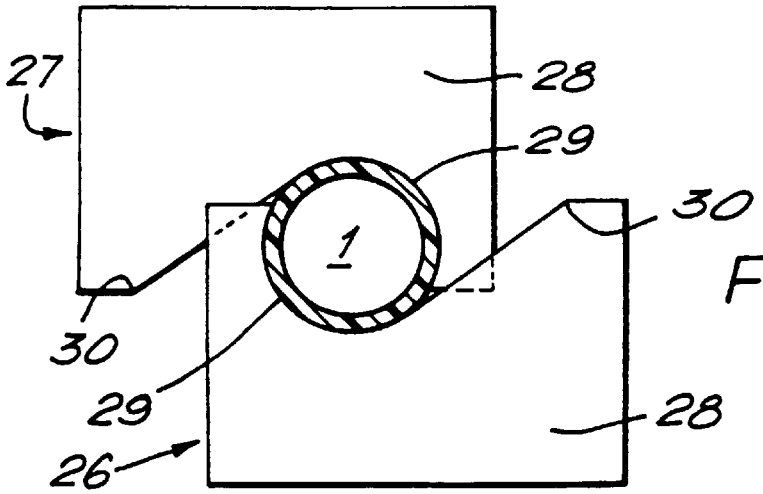
FIG. 5a.
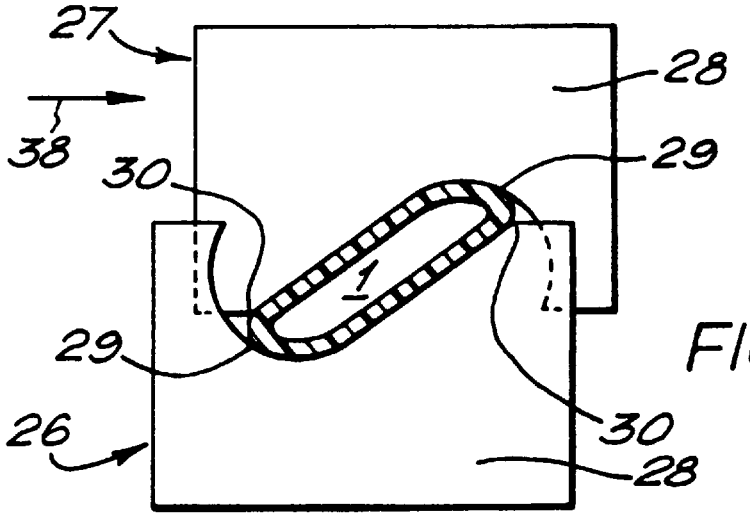
FIG. 5b.
FIG. 8.
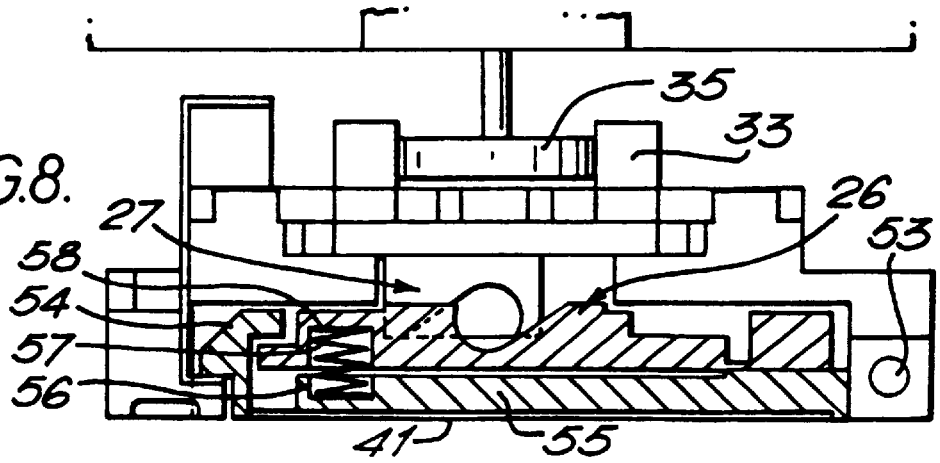

PUMPING DEVICE HAVING INLET AND OUTLET VALVES ADJACENT OPPOSED SIDES OF A TUBE DEFORMING DEVICE

Matter enclosed in heavy brackets [ ] appears in the original patent but forms no part of this reissue specification; matter printed in italics indicates the additions made by reissue.

This invention relates to pumping devices.

The invention seeks to provide improved such devices and in particular improved such devices for use in medical application such as the intravenous supply of fluids to a patient.

According to this invention, a pumping device comprises means for accommodating a length of tubing providing, in operation, passage for liquid through said device, means for deforming said tubing whereby to reduce its volume and, on either side of said deforming means, controllable valve means for restricting the flow of liquid through said tube.

According to a feature of the invention, a pumping device comprises means for accommodating a length of tubing providing, in operation, passage for liquid through said device, means for deforming said tubing whereby locally to reduce its volume, controllable valve means on either side of said deforming means for restricting the flow of liquid through said tubing and control means arranged to control the operation of said deforming means and said valve means whereby at times when said tubing is being deformed by said deforming means the valve means on the input side is in a condition of restricted flow whilst the valve means on the output side is in a condition of increased flow and at times when said volume is being restored the valve means on the output side is in a condition of restricted flow whilst the valve means on the input side is in a condition of increased flow, wherein liquid is displaced from the tubing as a function of the volume of the tubing reduced by the deforming means.

Normally the valve means on the input and the output sides are such that when fully operated, flow is stopped or permitted, as the case may be.

Normally the arrangement is such that deformation of said tubing by said deforming means is non-occlusive, that is to say that at the extreme of deformation the opposite internal surfaces of the tubing which approach each other do not make contact.

Preferably said deforming means is such that said tubing is first deformed in one direction and then in another which tends to restore the original cross-sectional shape of said tubing. In some examples of devices in accordance with the invention the deforming means is such that deformation in said other direction ceases as the original cross-sectional shape of the tubing is regained. In other examples the squeezing means is such that squeezing in said other direction continues beyond restoration of the original cross-sectional shape of said tubing to cause further local deformation of the cross-sectional shape of said tubing.

Preferably said deforming means comprises two members each having a series of transverse blades or ridges shaped to provide a valley through which said tubing may pass, one of said members being inverted relative to the other with its ridges interdigitated with the ridges of the other, said two members being arranged to move relative to one another in a direction transverse to the direction of passage of said tubing through said two valleys whereby to deform said tubing.

Preferably each ridge has a recess which is generally semi-circular to one side and of progressively decreasing depth to the other side until the full height of the ridge is reached.

Preferably all of the ridges of one member are substantially identical, with the generally semi-circular portions of their apertures to the same side.

Preferably again, viewed in the direction of passage of the tubing through the valley formed by the ridges, all of the ridges of one member appear superimposed.

With an arrangement as just described the generally semi-circular portions of the apertures in the ridges of one member are to one side and the generally semi-circular portions of the apertures in the ridges of the relatively inverted member are to the other side, as viewed in the direction of passage of said tubing through the valley.

Where, as will normally be the case, the length of tubing, when undeformed, is of substantially constant circular section through the pumping device, the curvature of the generally semi-circular portions of the apertures in the ridges of both members are normally such that in one position of relative movement of the two members, the generally semi-circular portions of the apertures in the ridges of the two members together form a passage of substantially circular cross-section of diameter closely similar to that of said tube.

Preferably said formed passage is of diameter slightly less than that of said tubing whereby gently to nip said tubing.

Preferably the ridges of each member bear on the surfaces between the ridges of the other member.

Preferably said two members are biassed one towards the other by resilient means, e.g. a spring.

In a preferred embodiment one of said two members is arranged to be stationary during operation whilst the other moves in the manner of a shuttle.

Where the pumping device comprises a housing with a closure, such as a door or lid, preferably the member which is arranged to be stationary during operation is carried by said closure whereby opening said closure releases said tubing from said deforming means. With such an arrangement, preferably the member which is arranged to be stationary during operation has limited freedom to move, independent of said closure, towards and away from said other member, biassing means, such as a spring, being provided between it and said closure tending to urge it towards said other member.

Preferably said member which is arranged to move in the manner of a shuttle is arranged to be driven via an eccentric by an electric motor which is controlled to move in operation in a series of discrete steps producing incremental steps of said member in a direction producing deformation of said tubing.

Preferably said last-mentioned member is arranged to be returned by said motor in the opposite direction in one relatively rapid movement.

Preferably each valve means comprises a guide member having a channel therethrough for said tubing and, within said channel, a rotary member having an off-centre projection extending generally parallel to the axis of rotation of said rotary member and having one face against which said tubing lies, the arrangement being such that said face defines, in part, said channel and partial rotation of said rotary member causes said tubing to be occluded by the resultant action of said face upon said tubing.

Preferably said face of said projection is partially recessed with a profiled surface adapted to bear on said tubing when said rotary member is partially rotated to a "start" position whilst the resulting overhang provides a closure (which may be partial) over the channel in said guide member capturing said tubing therein. Preferably stop means are provided for each rotary member whereby movement is limited in one direction of rotation to a position in which the face of its projection is so aligned with the tubing as to permit said tubing to be removed from said channel and in the other direction of rotation to a position beyond that at which said tubing is occluded. Preferably the control of said rotary members is such that in normal operation said last-mentioned position beyond that at which said tubing is occluded is not reached.

Preferably the stops in each case are provided by an arcuate slot or recess in the rotary member and co-axial with its axis of rotation, in co-operation with a fixed pin or other abutment.

Normally the two valve means are controlled to be operated without, or substantially without, overlap between the periods at which each is permitting liquid flow. In other words, movement of the rotary member of one valve means in a direction to reduce flow is arranged to be completed, or substantially completed, before movement of the rotary member of the other valve means in a direction to increase flow, and vice versa.

With an arrangement as just described, normally operator controllable means are provided for causing the rotary members of both valve means to rotate to a position in which the faces of said projections are so aligned with the tubing and the deforming means is so relaxed as to permit the tubing to be removed from said channel.

Where said pumping device comprises a housing with a closure, such as a door or lid, preferably opening said closure is arranged to cause both valve means to be set to conditions restricting the flow of liquid and preferably thereafter to cause the moving member of said deforming means to be returned to a position of minimum deformation of said tubing.

Preferably again the arrangement is such that closing said closure causes the moving member of said deforming means to be driven to its extreme position of movement in a direction deforming said tube with the valve means on the outlet side in a condition of restricted flow and the valve means on the inlet side in a condition of increased flow and thereafter indexed back, with both valve means remaining in the conditions just mentioned, to a predetermined start position whereafter the valve on the inlet side is set to a condition of restricted flow and the valve on the outlet side is set to a condition of increased flow and the cycle of operation of said deforming means and valve means is commenced.

Preferably said aforementioned operator controllable means comprises a control (e.g. a button) accessible to an operator only when said closure is open and operable after the sequence of operations consequent upon opening said closure, as described above, is complete. Before operating said aforementioned operator controllable means an operator may have closed a clamp (e.g. a roller clamp) fitted to the tubing in order to avoid passage of fluid through said tubing when the length of tubing is removed from said channel.

Preferably each rotary member and the moving member of said deforming means are arranged to be driven by dedicated electric motors.

Preferably the control means controlling the operation of the motors driving said rotary members and the motor driving the member of said deforming means which is arranged to move in the manner of a shuttle comprises a microprocessor. Preferably at least the motor arranged to drive the movable member of the deforming means has associated therewith an encoder which produces an output signal indicative of the position of or extent to which the member driven by that motor has moved, means being provided for passing the signals thus produced to said microprocessor for use as reference signals in the timing of the generation of motor control signals by said microprocessor.

The microprocessor and its associated control electronics may be housed within said housing or remotely therefrom with cable or other suitable interconnection.

By suitably selecting the timing of the movements of the rotary members and the moving member of the deforming means and the increments by which the last-mentioned is driven, it is possible to achieve a satisfactorily smooth and consistent flow of liquid through the pumping device as required for the intravenous supply of fluids to a patient for example. For such purposes it is important that the tubing be readily disposable and, as will be appreciated, the construction of a pumping device in accordance with the present invention may be such that the tubing may be changed rapidly when required whilst avoiding uncontrolled flow of fluid to the patient.

Normally the tubing used is standard p.v.c. tubing, in a typical medical application of diameter approximately 4.1 mm and wall thickness of 0.5 mm.

The invention is illustrated in and further described with reference to the accompanying drawings in which:

FIG. 3 illustrates in greater detail the inlet and outlet valve means 3 and 4 of FIG. 2.

FIGS. 4 and 5 illustrate the nature and operation of the deforming means 2 of FIG. 2.

Figure 7:
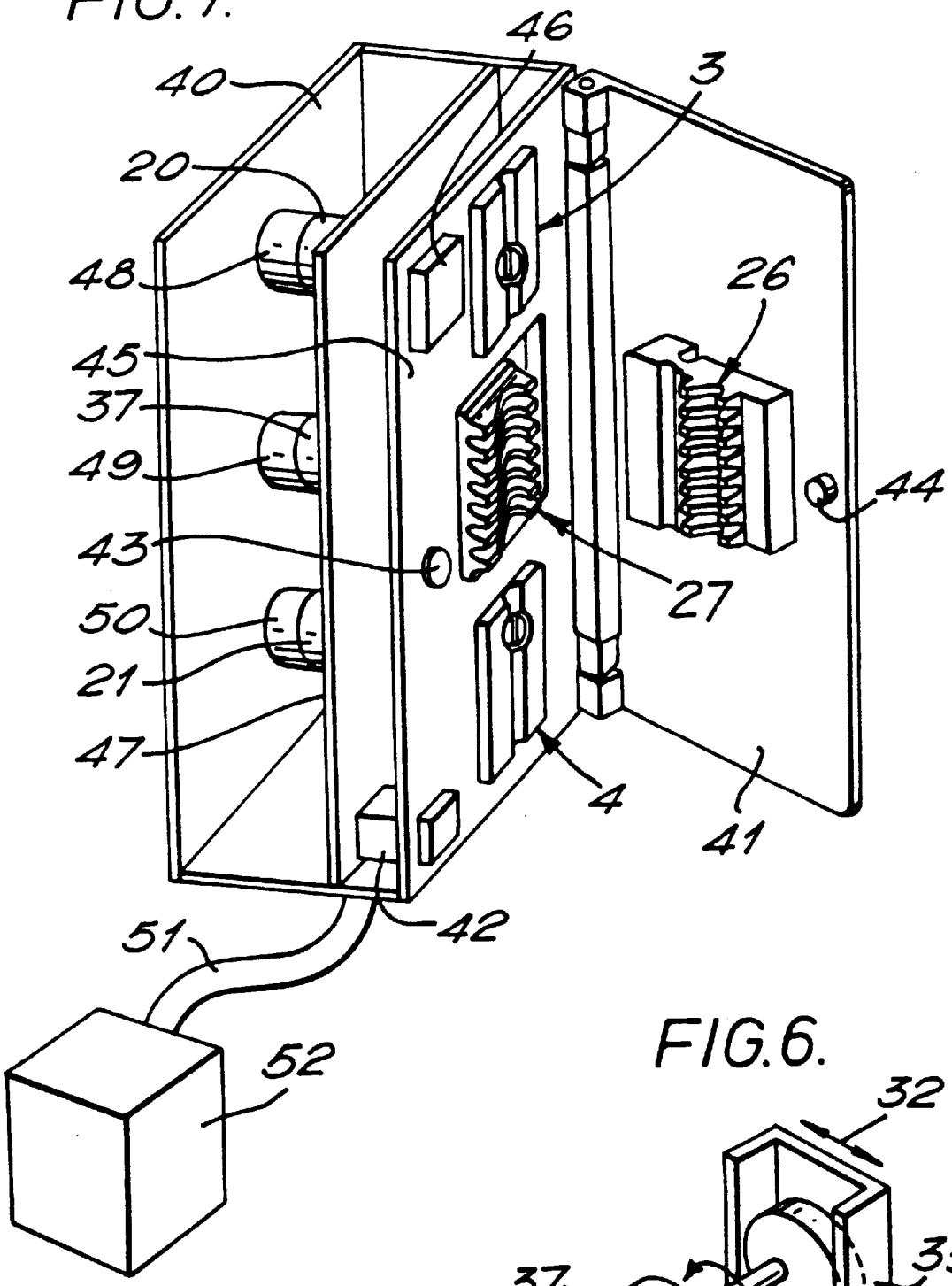
FIG. 7 is a semi-schematic perspective view of a complete pumping device as described with reference to FIGS. 2 to 6.

FIG. 8 shows in section the door 41 of FIG. 7 together with the stationary member 26 and moving member 27 of the deforming means illustrated in FIG. 4.

Figure 9:
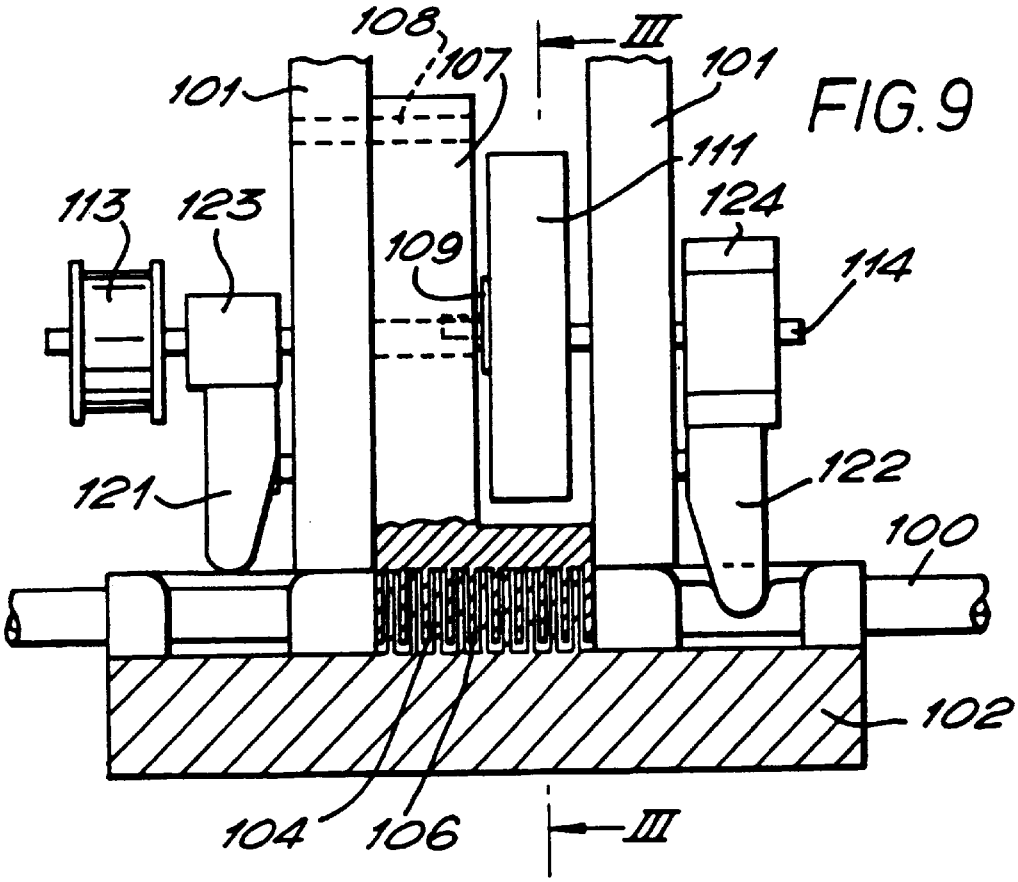
Figure 10:
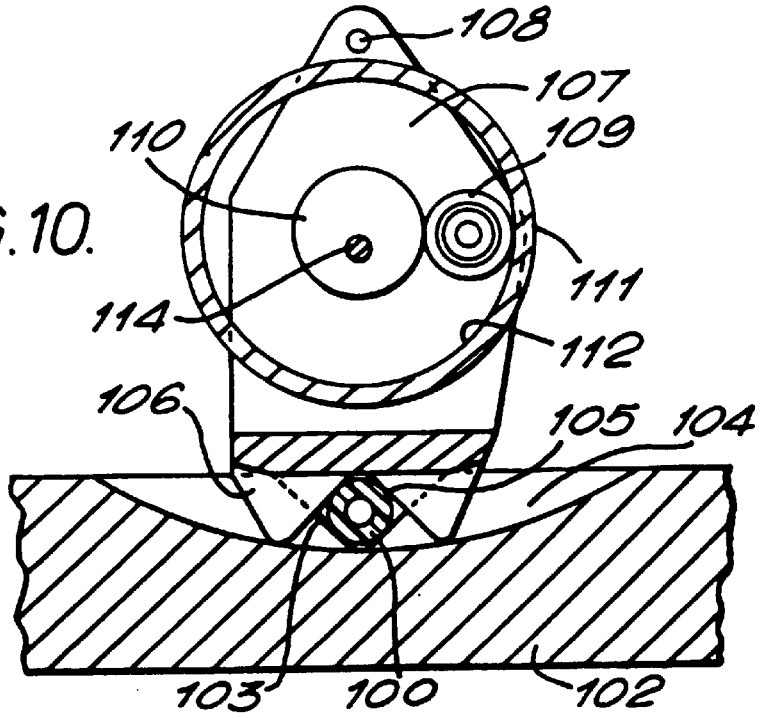

FIG. 9 is a side view partly in cross-section of another embodiment of the invention, and FIG. 10 is an end view partly in cross-section along the line III—III of FIG. 9.

In all of the Figures, parts are not necessarily represented to scale.

Referring to FIG. 1, this illustrates in highly schematic manner at (a), (b) and (c), the three principle stages in a cycle of operation of one simple form of pumping device in accordance with the present invention.

In (a), (b) and (c) a length of flexible p.v.c. tubing is represented at 1. The p.v.c. tubing is standard tubing of substantially constant undeformed cross-sectional dimensions throughout its length. Means for locally deforming the tubing 1 by squeezing is shown at 2, whilst on both the inlet (top as viewed) and outlet (bottom as viewed) sides of the squeezing means 2 are controllable valve means, 3 and 4 respectively, for restricting (and in this case shutting off by occlusion) the flow of liquid in the tube 1.

Figure 1C:
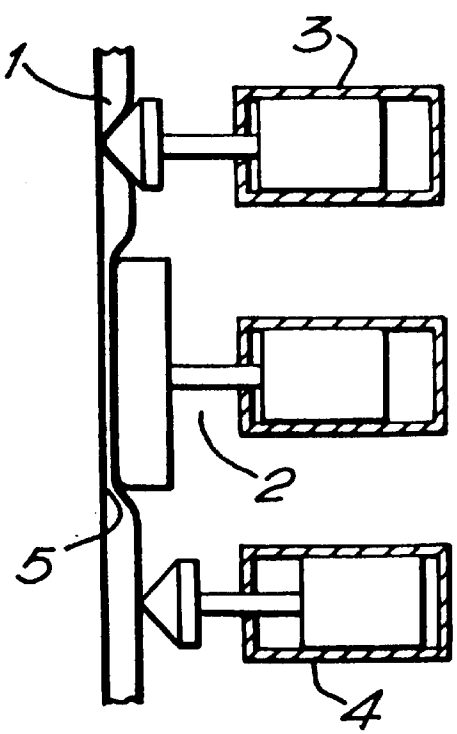
FIG. 1 illustrates in highly schematic fashion the cycle of operation of one simple form of pumping device in accordance with the present invention.
Figure 1B:
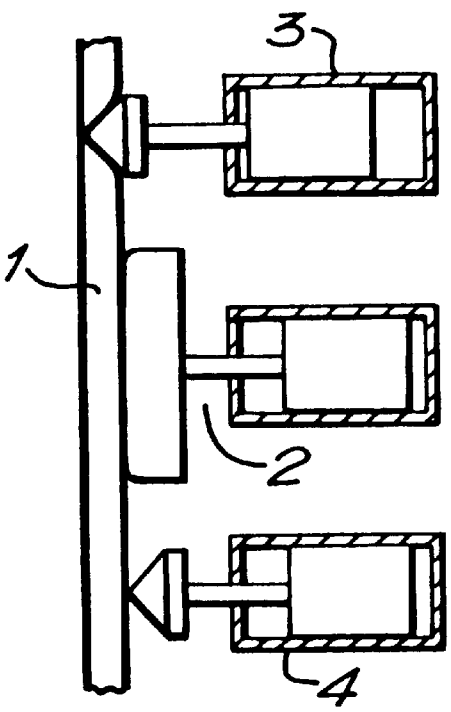
Figure 1A:
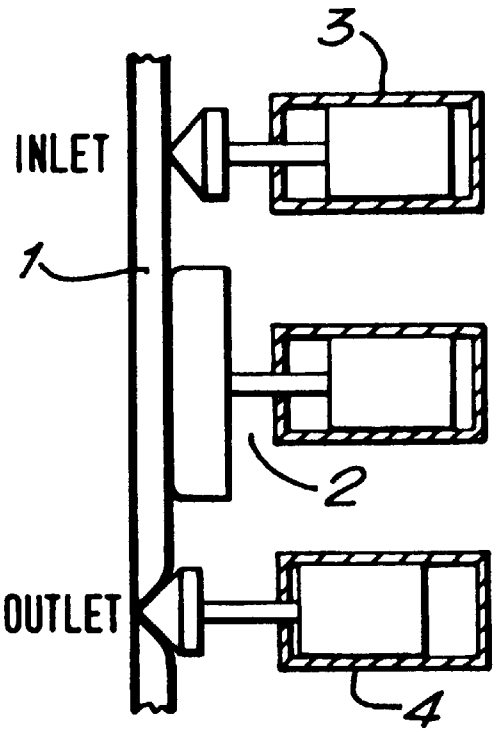

In FIG. 1(a) the outlet valve means 4 is activated to close off flow to the outlet. The deforming means 2 is relaxed, and the inlet valve means 3 is relaxed thus permitting flow from the inlet.

In FIG. 1(b) outlet valve means 4 has relaxed and inlet valve means 3 has been activated to close off the inlet. Deforming means 2 is about to be activated.

In FIG. 1(c) deforming means 2 is shown fully activated, with outlet valve means 4 remaining relaxed and inlet valve means 3 remaining activated. Fluid now passes to the outlet. It may be noted that even when deforming means 2 is fully activated as shown in (c) the tubing 1 is not occluded, there remaining a small gap 5 between approaching opposite sides of the tubing deformed by squeezing.

The cycle then repeats. In fact, whilst not represented in the simple representation of FIG. 1, in preferred embodiments immediately following the deforming action illustrated in (c) the tubing would be deformed in a different direction tending to restore the original cross-sectional shape of the tubing.

Figure 2:
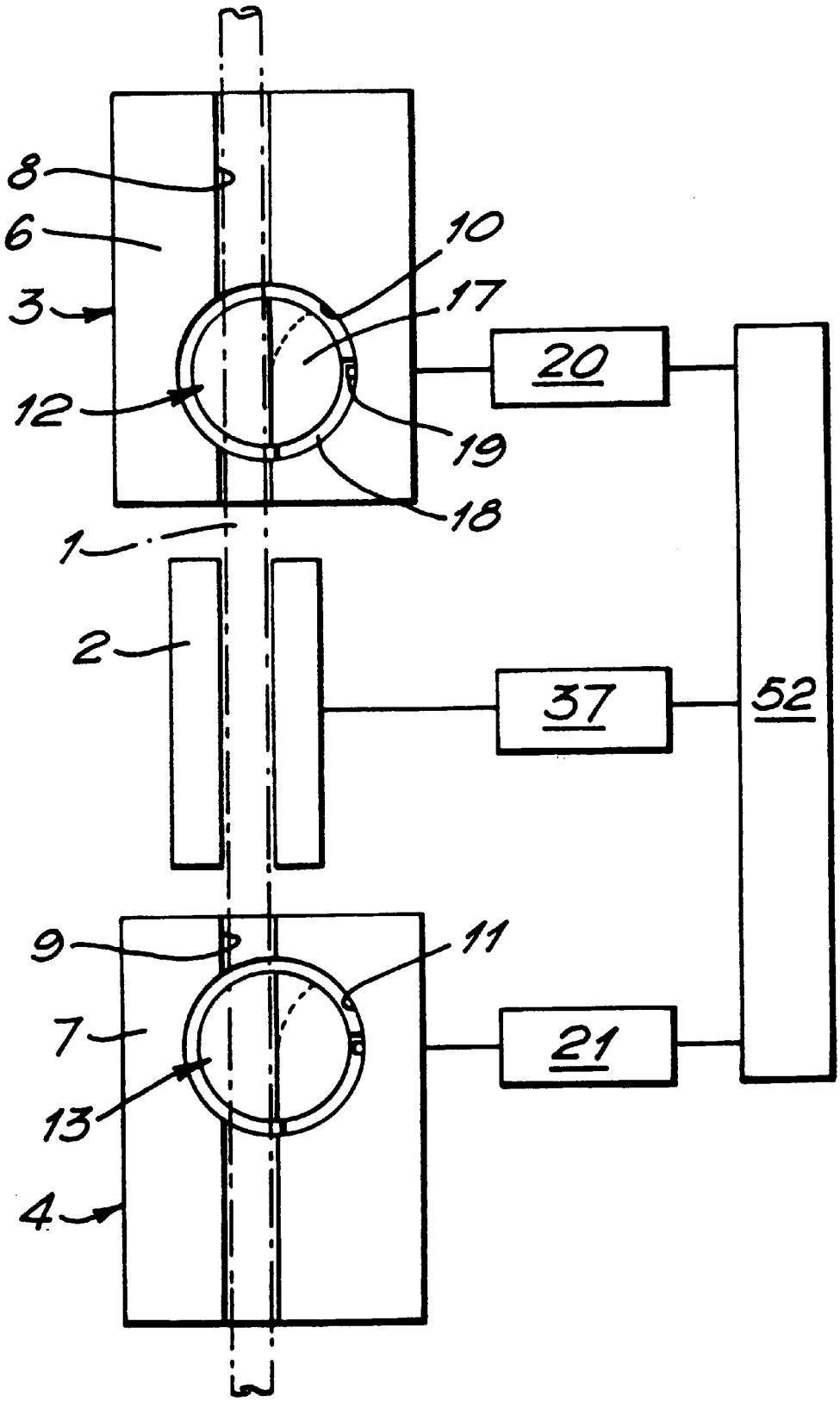
FIG. 2 illustrates, semi-schematically, a preferred form of pumping device in accordance with the present invention intended for medical applications such as the intravenous supplies of fluid to a patient.

Referring to FIG. 2, further details of the inlet valve means 3 and outlet valve means 4 and the squeezing means 2 are shown in FIGS. 3 and FIGS. 4 and 5 respectively.

In FIG. 2 the tubing 1 is shown in dotted outline. Each of the valve means 3, 4 consists of a guide member 6, 7 having a channel 8, 9 in which the tubing 1 may rest. Within each channel 8, 9 is a circular enlargement 10, 11 housing a rotary member 12, 13. Further understanding of the nature of the arrangement may be gained by reference to FIGS. 3(a), (b) and (c) of which FIGS. 3(a) and (b) illustrate a transverse section across the guide member 6 through the centre of the rotary member 12, viewed in the direction of liquid flow from the inlet (top as viewed) to the outlet (bottom as viewed) and FIG. 3(c) is a perspective view of rotary member 12 removed from the circular enlargement within channel 8. Whilst only the arrangement of rotary member 12 is shown in and described with reference to FIGS. 3(a), (b) and (c), the arrangement of rotary member 13 may be taken to be essentially similar. Rotary member 12 has a projection 14 extending into the channel 8 from a base portion 15. Projection 14 is off-centre to accommodate the tubing 1. The projection 14 is formed with a progressively recessed profiled surface 16 which acts upon the surface of the tubing 1 as rotary member 12 is rotated in an anti-clockwise direction (as viewed in FIG. 2). The recession formed by the profiling of the surface 16, leaves an overhang 17. When rotary member 12 is rotated as described, overhang 17 provides a partial closure over channel 8 which renders the tubing 1 captive. As shown in FIG. 2, and in (b) of FIG. 3 the rotation of rotary member 12 is such that the surface 16 is, broadly speaking, aligned with the channel 8 such that the tubing is not captive. In this state, the tubing may readily be removed (ignoring the effects of the deforming means 2 for the moment and assuming that rotary member 13 is similarly rotated). If rotary member 12 is rotated in an anti-clockwise direction (as viewed in FIG. 2) the profiled surface 16 bears upon the tubing 1 and this occludes the tubing 2 at that point and acts to shut off the inlet (corresponding rotation of rotary member 13 shuts off the outlet of course).

In fact, the rotary members 12, 13 are only rotated to positions shown in FIG. 2 and FIG. 3(b) when the pumping device is inoperative and an operator has operated a control to set them thus, so as to enable the tubing 1 to be discarded and replaced by fresh tubing. Normally the "start" position for each rotary member 12, 13 in its cycle of operation is one as represented in FIG. 3(a) for member 12. The rotary member in question is rotated- (again anti-clockwise as viewed in FIG. 2) until the overhang 17 (in the case of rotary member 12) covers the channel 14 sufficient to prevent accidental removal of the tubing 1, and the tube is nipped almost to occlusion. For medical applications, as referred to, the amount of flow required is small (typically 100 cc's per hour) and the actual rotation required of the rotary member from a position at which the tubing 1 is occluded to a position permitting sufficient flow is correspondingly not great.

Each rotary member 12, 13 is connected to be rotated by d.c. motors 20, 21 to and fro over a predetermined arc from the "start" position of rotation as aforesaid to a position in which the tubing is occluded by the profiled surface, 16 in the case of rotary member 12. In order to provide stops limiting rotational movement of the rotary members 12, 13 in each direction of rotation, arcuate recesses (18 in the case of rotary member 12 as shown in FIG. 3(c)) are provided in the base portions (15 in the case of member 12) of each rotary member 12,13. These arcuate recesses co-operate with fixed pins such as that schematically represented at 19 in FIGS. 3(a) and (b).

Referring to FIG. 4 this illustrates at (b), by way of a perspective sketch, the two principal components of the deforming means 2 of FIG. 2. The view shown in (a) is in the direction of the arrow 25 in (b) and shows the two principal component members 26 and 27 of the deforming means united.

Member 26 has a series of transverse ridges 28 which are shaped to provide a valley through which the aforementioned tubing 1, again shown in dotted outline, may pass. As best illustrated in FIG. 5, which demonstrates the action of the deforming means 2, each ridge 28 has a recess which is semi-circular to one side 29 and of progressively decreasing depth towards the other side 30 of the recess until the full height of the ridge is reached. Viewed in the direction of the passage of the tubing 1 through the valley formed by the recesses in the ridges 28 all of the ridges of the member 26 appear superimposed one upon the other, with all of the semi-circular portions of the recesses to the same side.

Figure 6:
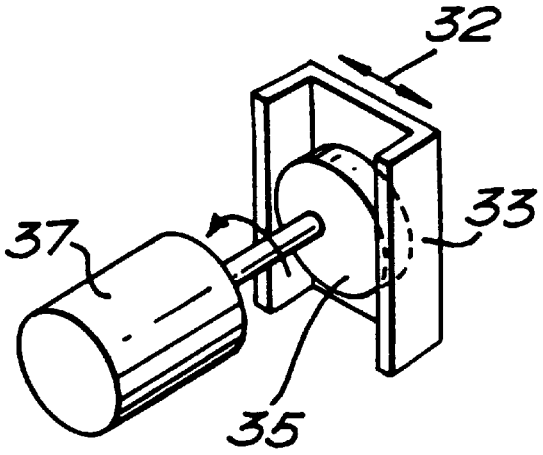
FIG. 6 illustrates the method of driving the moving or shuttle member 27 of FIG. 4.

The member 27 is generally similar to the member 26 (as reflected by the use of like reference numbers for like parts) except that it is relatively inverted with, as best seen from FIG. 4(a), the ridges 28 of one interdigitated with the ridges 28 of the other. Whilst in FIG. 4(a), for ease of illustration, a gap is shown between the two members 26 and 27, in practice the ridges 28 of each member 26 or 27 bear on the surfaces 31 between the ridges 28 of the other member 27 or 26. Whilst not shown in FIGS. 4 and 5, but as more fully described with reference to FIG. 8 later, the two members 26 and 27 are spring biased one towards the other. The member 26 is arranged to be stationary during operation whilst member 27 is arranged to move in the manner of a shuttle, to and fro as represented by the double headed arrow 32 in FIG. 4. The means by which such shuttle like movement is accomplished is illustrated in FIG. 6 which shows a cam follower 33 which is attached to the plain surface 34 (FIG. 4) of the member 27, that is to say the obverse face relative to the face formed in the shape of the ridges 28. The cam follower 34 is driven to and fro by an eccentrically mounted drive wheel 35 driven by a motor 37, also shown and referenced as such in FIG. 2. The effect of one cycle of movement of the member 27 relative to the member 26 is best seen from FIG. 5. In (a) of FIG. 5 the position of member 27 relative to member 26 is such that the semi-circular portions of the recesses in the ridges 28 of the two members 26,27 form a passage which is of substantially circular cross-section through the squeezing device in which the tubing 1 passes with no or no significant distortion. The diameter of the passage of circular cross-section is 4 mm with tubing of 4.1 mm outside diameter so as to provide a degree of "nip" at all times when the tubing is in place. As the motor 37 is driven in intermittent fashion so it produces rotation in a series of steps which moves the member 27 in the direction of the arrow 38 (FIG. 5(b)) so as to squeeze the tube 1 to produce a cross-section which is oval in shape and of reduced area. At the limit of movement of the member 27 in the direction of the arrow 38 (as determined by the action of the cam wheel 35 and cam follower 33 and as illustrated in FIG. 5(b)) the tubing does not occlude. That is to say, squeezing ceases before the approaching sides of the increasingly elliptical tubing make contact. In fact, the action of the ridges 28 of the members 26 and 27 on the tubing 1 induces a rolling motion of the tubing 1 so that this is not continually flexed in zones that are narrow in extent.. As the limit of movement of the member 27 in the direction of the arrow 38 is reached the drive applied to the motor 37 is changed from a series of short pulses to one long pulse producing accelerated rotation of the wheel 35 and reverse movement of the member 27 by virtue of the action of the cam wheel 35 and cam follower 33 with a relatively rapid return of the member 27 to the start position shown in FIG. 5(a). This cycle repeats continuously whilst the pumping device is energised.

As the member 27 is moved shuttle-like as described above, so the controllable restrictive devices 3 and 4 are operated as already described and fluid is passed in a controlled fashion through the pumping device from input to output.

The precise timing of the shuttle-like movements of the member 27 relative to the member 26 and the operation of the controllably restrictive devices 3 and 4 may be seen from the following table. This is for a typical case with standard PVC tubing of 4 mm outside diameter of which 35 mm in length lies within the deforming means 2, using typical miniature d.c. electric motors for drive and to give a flow rate of 100 cc's per hour.

| ACTION | ELAPSED TIME FROM START POSITION |
|---|---|
| CLOSE INLET | 0 |
| OPEN OUTLET | 100 |
| START SHUTTLE MOVEMENT OF MEMBER 27 IN DIRECTION OF ARROW 38 (FIG. 5) | 200 |
| CLOSE OUTLET | 3000 |
| OPEN INLET | 3100 |
| START REVERSE MOVEMENT OF MEMBER 27 | 3200 |
| RETURNED TO START POSITION AND REPEAT | 3500 |

The time given in respect of each operation is in milliseconds from the "start" position. To move the member 27 in the direction of arrow 8 from the "start" position shown in FIG. 5(a) to the limit of movement position shown in FIG. 5(b), in a period of 3000 milliseconds, motor 37 is driven in discrete steps under electronic control (as known per se) to give a smooth flow of liquid.

A somewhat schematic perspective view of the complete pumping device is shown in FIG. 7. All of the mechanical components, together with motors 20,21 and 37 and associated encoders controlling the motion of each are contained within a housing 40 shown with its outer casing removed. Housing 40 has a lid or door 41, shown opened.

Opening of the door 41 is controlled by means of a suitable latch, the details of which are not shown, operated by a push button 42 which extends through the casing when fitted. A microswitch arrangement of which the actuator button is represented at 43 is operated by a push rod 44 extending from the door 41 is arranged to deactivate the pumping device as the door 41 is opened, as will be described in more detail later.

The relatively stationary member 26 of the deforming means 2 as illustrated in FIG. 4 is, as shown, carried by the door.

The mounting of the member 26 on the door 41 is such as to permit limited movement of the member away from the door and a spring (not shown in FIG. 7) between the door and the member urges the latter towards the interior of the housing 40 (when the door is shut).

Within the housing 40 is a front panel 45 which carries the movable member 27 of the deforming means 2 (as described with reference to FIG. 4) together with the controllable valve means 3,4 (as described with reference to FIG. 3) arranged as described with reference to FIG. 2. The front panel 45 also carries the aforementioned actuator button 43 of the microswitch and an operator-controlled push button switch 46 provided to command rotation of the rotary members 12,13 of the controllable restrictive means 3,4 to positions beyond their "start" positions (and against one stop) to enable the tubing 1 to be removed from the channels 8,9 in guides 6,7 as already described with reference to FIG. 3.

Behind the front panel 45 is a printed circuit board 47 which carries the three drive motors 20,21 and 37 and their associated encoders, represented at 48,49,50.

The encoders 48,49,50 produce output signals indicative of the position of or the extent to which its associated motor has driven the respective member (rotary member of a controllable valve means or movable member of the squeezing device). Whilst each of motors 20,37 and 21 has an encoder 48,49 and 50 associated with it in this embodiment, in other embodiments the arrangement may be simplified (and cost saved) by providing only encoder 49 associated with shuttle motor 37 from which all necessary timing signals may be derived.

A twenty-way ribbon cable 51 connects the printed circuit board 47 to a remote microprocessor-based control unit 52 (also represented in FIG. 2) containing a microprocessor and associated control electronics which is provided to control the movements of the motors 20,21 and 37 utilising the position indicative signals produced by the encoders 48,49,50 as reference signals. The cable 51 also carries to the microprocessor control unit 52 signals from the microswitch operated by actuator button 43 indicative of "door open" or "door shut" and signals from operator controlled push button switch 46.

The mounting of the relatively stationary member 26 of the deforming means in the door 41 and the mounting of the movable member 27 on the front panel 45 is shown in detail in FIG. 8 which is a horizontal section through the relevant parts. Referring to FIG. 8 the door 41 is hinged at 53. A recessed guide 54 extending inwardly from the inside of the door 41 holds the stationary member 26 of the deforming means captive whilst permitting limited movement towards and away from the door 41. A mounting block 55 on the inside of the door 41 and between the door 41 at the member 26 is recessed at 56. Recess 56 houses a coil spring 57 which extends into an aligned recess 58 in non-ridged (obverse) face of member 26. Spring 57 urges member 26 away from the door and thus into contact with the movable member 27 of the deforming means as previously described with reference to FIG. 4.

The design of the microprocessor control unit 5 will be readily apparent to those skilled in the art from the following description of the sequence of operations of the pumping device described with reference to FIGS. 2 to 8.

Assuming that the door 41 is shut and the pumping device is operating normally, opening the door 41 causes the microswitch actuated by actuator button 43 to send a "door open" indicative signal to the microprocessor control unit 53. Upon receipt, control unit 53 causes the outlet valve means 4 to close off the outlet and the inlet valve means 3 to close off the inlet. The moving member 27 of the deforming means 2 is returned to its position of minimum deformation, as illustrated in FIG. 5(a). The pumping device is now in a passive state, with the tubing captive in the channels 8,9 by virtue of the overhangs such as 17 in the case of rotary member 12, covering the channels.

It should now be assumed that the operator wishes to change the tubing 1. Normally the operator firstly closes a clamp (such as a standard roller clamp) fitted to the tubing 1, e.g. beyond the outlet. A label may conveniently be attached adjacent to the push button 46 to remind the operator to fit the clamp. Push button is now operated and responsive to the signal thus generated control unit 53 causes the rotary members 12,13 to be rotated in a direction to release pressure on the tubing 1 (clockwise as viewed in FIG. 2) beyond their normal "start" positions and against the stops provided to limit movement in that direction of rotation. As has already been described with reference to FIGS. 2 and 3, in this position the profiled surfaces of the projections (i.e. such as surface 16 of projection 14 of rotary member 12) are, broadly speaking, aligned with the channels 8,9 which are thus uncovered by the overhangs (e.g. overhang 17). Because the stationary member 26 has already been swung away from the moving member 27 of the deforming means 2 by the opening of the door 41, the tubing 1 may be removed.

Having discarded the tubing 1 and inserted a replacement, door 41 is shut. The microswitch thus operated by actuator button 43 signals again to the control unit to indicate "door shut". Responsive to this, control unit 52 causes outlet valve 4 to close off the outlet whilst inlet valve 3 remains in a condition in which the inlet is open (or is rotated to its "start" position). Moving member 27 of the deforming means 2 is driven to its extreme position of movement in a direction deforming the tube 1 and is then indexed back to its predetermined "start" position. At each extreme the positional indications provided by encoder 49 are noted by the microprocessor and serve to set up the index for subsequent operation. In addition to setting the device, this action also charges the length of tubing with liquid in through the opened inlet. The sequence of operation already described with reference to the table provided now commences with the closing of the inlet by inlet valve means 3.

Whilst the pumping device described above is controlled by a microprocessor control unit, and this is preferred, the required timing and drives may be provided in other embodiments by discrete electrical components or indeed by mechanical means such as cam shafts and cam followers which are interconnected to operate in synchronisation. An example of such a device as last-mentioned, whilst not now preferred, will be described with reference to FIGS. 9 and 10.

Referring to FIGS. 9 and 10, 101 represents a fixed frame to which is adhered a base or anvil plate 102. The base plate will be separable from the frame 101, for example by being hinged, so that it may move away from the frame 101, for example swinging in gate fashion, so as to enable free access to be had to a V-shaped groove 103 formed in the baseplate 102 and. defined by a plurality of ridges or blades 104 which may be integral with or fixed to the baseplate. However, whether or not it is hinged, in the operative condition of the apparatus, the baseplate 102 will be positioned as shown in FIGS. 9 and 10.

100 represents a length of hollow tubing, of plastics material such as p.v.c., laid in the V-shaped groove 103 defined in the array of blades 104 of the baseplate 102. The tube length 100 is also located in a second groove 105 of opposed V-shape which groove 105 is defined by an array of blades 106 formed on an armature or shuttle 107 pivotally mounted by a pin or the like 108 on the frame 101. The blades 106 intermesh with the blades 104, as is best seen in FIG. 10.

Pivotting on pin 108, the armature or shuttle 107 is moved back and forth in reciprocating arcuate movements of short stroke, by virtue of carrying a roller 109 engaging firstly against a cam 110 and secondly behind the circular rim 112, both the cam and the rim being concentric with one another and being fast on a wheel 111. The wheel 111 is fixed on a shaft 114 which is supported for rotation on frame 101, the shaft 114 being rotated by driven pulley 113. The cam 110 and the rim 112 are eccentric relative to the rotational axis of the shaft 114.

A motor whose operational speed is accurately adjustable, is employed the drive the pulley 113 through a cogged drive belt. In this way, the rate of shuttle movement and hence the rate of pumping can be accurately set. Normally these rates are set during assembly and are not routinely adjustable.

As the armature 107 swings to the left, in FIG. 10, the righthand side of the V-shaped groove 105 defined by the blades 106 moves to the left and towards the lefthand side of V-shaped groove 103 defined by the blades 104. Conversely, as the armature swings to the right, in FIG. 10, the lefthand side of V-shaped groove defined by the blades 106 moves to the right and towards the righthand side of the V-shaped groove defined by the blades 104. In this way the tubing confined in the space bounded by the opposed V-shaped grooves, is alternately squeezed from two different directions. The stroke of the swinging movement of the blades 106 is controlled to be such that the tubing is deformed, but not occluded.

If these two directions are substantially normal to one another, and if the tubing 100 is a relatively close fit in the space defined by the opposed V-shaped grooves 103 and 105, it will be appreciated that the configuration of the cross-section of the tubing is continually and positively controlled as it is squeezed alternately back and forth to adopt one or other of two elliptical cross-sectional configurations. Such control will ensure that during the transition from one elliptical shape to the other and back again, there will be an intermediate stage during each transition when the tubing again adopts its shape when undeformed, that is to say it returns to a circular cross-section. The stroke of the armature 107, as it is reciprocated pivotally back and forth, is controlled, by the roller 109 engaging both the cam 110 and the wheel rim 112 as the wheel 111 rotates, such that the tubing never completely closes. Finally, the location of the tubing as a close fit in the intermeshing teeth defining the grooves will ensure that the tubing rolls or twists, rotating about its axis as it is successively deformed from, and restored to, its original shape, by the changing cross-section defined by the intermeshing teeth.

The opposing grooves 103 and 105 are, as stated above, respectively formed in two sets of intermeshing blades.

As will be appreciated whilst in the arrangement described with reference to FIGS. 9 and 10 the grooves defined by the blades are V-shaped, in fact shapes corresponding to the apertures in the ridges of the two members forming the squeezing device shown in FIG. 4 could be applied here also. In addition the exemplary dimensions given for the intermeshing blades of the embodiment described with reference to FIGS. 9 and 10 may be applied to the ridges of the squeezing device described with reference to FIG. 4.

In all of the embodiments described above if desired provision may readily be made whereby the flow rate may be altered during service, e.g. by adjustment to the cycle time.

It will also be appreciated that whilst a pumping device in accordance with the present invention is primarily intended for medical applications, as previously mentioned, such devices may find application in other fields.

I claim:

1. A pumping device comprising:

means for accommodating a length of tubing providing, in operation, passage for liquid through said device, means for deforming said tubing whereby to reduce its volume, and controllable valve means including independently controlled valve actuators provided adjacent opposed sides of said deforming means for restricting the flow of liquid through said tube, wherein said deforming means comprises members arranged for controlled relative movement in opposed directions in parallel planes transverse to the direction of liquid passage within said tubing, said members adapted to engage said tubing between said actuators, whereby said tubing is first deformed in one transverse direction and then in the opposed transverse direction which tends to restore the original cross-sectional shape of said tubing, and control means for controlling said value actuators to open and close in synchronism with deforming of said tubing so that liquid is displaced from an outlet side of said tubing as a function of change of volume of the tubing during deformation.

2. A pumping device comprising:

means for accommodating a length of tubing providing, in operation, passage for liquid through said device, means for deforming said tubing to reduce its volume locally, inlet and outlet independently controlled valve means provided adjacent opposed sides of said deforming means for restricting the flow of liquid through said tubing, and control means arranged to control the operation of said deforming means and said valve means such that at times when said tubing is being deformed by said deforming means to reduce the volume of liquid locally, the inlet valve means is in a condition of *restricted flow whilst the outlet valve means is in a condition of* increased flow and liquid is thereby displaced from an outlet of the tubing and at times when said volume is being locally restored the outlet valve means is in a condition of restricted flow whilst the inlet valve means is in a condition of increased flow, and wherein said deforming means comprises members arranged for controlled relative movement in opposed directions in parallel planes transverse to the direction of liquid passage within said tubing, said members adapted to engage said tubing between said actuators, whereby said tubing is first deformed in one transverse direction and then in the opposed transverse direction which tends to restore the original cross-sectional shape of said tubing.

3. A device as claimed in claim 2 and wherein the inlet and outlet valve means are such that when fully operated, flow is stopped or permitted, as the case may be.

4. A device as claimed in claim 2 and wherein the arrangement is such that deforming of said tubing by said deforming means is non-occlusive.

5. A device as claimed in claim 2 and wherein the deforming means is such that deforming in said other direction ceases as the original cross-sectional shape of the tubing is regained.

6. A device as claimed in claim 2 and wherein the deforming means is such that deforming in said other direction continues beyond restoration of the original cross-sectional shape of said tubing to cause further local deformation of the cross-sectional shape of said tubing.

7. A device as claimed in claim 2 and wherein the two valve means are controlled to be operated substantially without overlap between the periods at which each is permitting liquid flow.

8. A device as claimed in claim 2 and wherein each valve means comprises a guide member having a channel therethrough for said tubing and, within said channel, a rotary member having an off-centre projection extending generally parallel to the axis of rotation of said rotary member and having one face against which said tubing lies, the arrangement being such that said face defines, in part, said channel and partial rotation of said rotary member causes said tubing to be occluded by the resultant action of said face upon said tubing.

9. A device as claimed in claim 8 and wherein said face of said projection is partially recessed with a profiled surface adapted to bear on said tubing when said rotary member is partially rotated to a "start" position whilst the resulting overhand provides a closure the channel in said guide member capturing said tubing therein.

10. A device as claimed in claim 8 and wherein operator controllable means are provided for causing the rotary members of both valve means to rotate to a position in which the faces of said projections are so aligned with the tubing and the squeezing means is so relaxed as to permit the tubing to be removed from said channel.

11. A device as claimed in claim 8 and wherein stop means are provided for each rotary member whereby movement is limited in one direction of rotation to a position in which the face of its projection is so aligned with the tubing as to permit said tubing to be removed from said channel and in the other direction of rotation to a position beyond that at which said tubing is occluded.

12. A device as claimed in claim 11 and wherein the control of said rotary members is such that in normal operation said position beyond that at which said tubing is occluded is not reached.

13. A device as claimed in claim 11 and wherein the stops in each case are provided by an arcuate slot or recess in the rotary member and coaxial with its axis of rotation, in co-operation with a fixed pin.

14. A pumping device comprising means for accommodating a length of tubing providing, in operation, passage for liquid through said device, means for deforming said tubing to reduce its volume locally, inlet and outlet controllable valve means provided adjacent opposed sides of said deforming means for restricting the flow of liquid through sad tubing and control means arranged to control the operation of said deforming means and said valve means whereby at times when said tubing is being deformed by said deforming means the inlet valve means is in a condition of restricted flow whilst the outlet valve means is in a condition of increased flow and at times when said volume is being restored the outlet valve means is in a condition of restricted flow whilst the inlet valve means is in a condition of increased flow, and wherein said deforming means comprises two members each having a series of transverse blades or ridges shaped to provide a valley through which said tubing may pass, one of said members being inverted relative to the other with its ridges interdigitated with the ridges of the other, said two members being arranged to move relative to one another in a direction transverse to the direction of passage of said tubing through said two valleys whereby to deform said tubing.

15. A device as claimed in claim 14 and wherein the ridges of each member bear on the surfaces between the ridges of the other member.

16. A device as claimed in claim 14 and wherein said two members are biassed one towards the other by resilient means.

17. A device as claimed in claim 16 and wherein said resilient means is a spring.

18. A device as claimed in claim 14 wherein one of said two members is arranged to be stationary during operation whilst the other moves in the manner of a shuttle., wherein each valve means comprises a guide member having a channel therethrough for said tubing and, within said channel, a rotary member having an off-centre projection extending generally parallel to the axis of rotation of said rotary member and having one face against which said tubing lies, the arrangement being such that said face defines, in part, said channel and partial rotation of said rotary member causes said tubing to be occluded by the resultant action of said face upon said tubing and wherein each rotary member and the moving member of said deforming means are arranged to be driven by dedicated electric motors and wherein the control means controlling the operation of the motors driving said rotary members and the motor driving the member of said deforming means which is arranged to move in the manner of a shuttle comprises a microprocessor.

19. A device as claimed in claim 18 and wherein at least the motor arranged to drive the movable member of the deforming means has associated therewith an encoder which produces an output signal indicative of the position of or extent to which the member driven by that motor has moved, means being provided for passing the signals thus produced to said microprocessor for use as reference signals in the timing of the generation of motor control signals by said microprocessor.

20. A device as claimed in claim 14 and wherein each ridge has a recess which is generally semi-circular to one side and of progressively decreasing depth to the other side until the full height of the ridge is reached.

21. A device as claimed in claim 20 and wherein all of the ridges of one member are substantially indentical, with the generally semi-circular portions of their apertures to the same side.

22. A device as claimed in claim 21 and wherein, viewed in the direction of passage of the tubing through the valley formed by the ridges, all of the ridges of one member appear superimposed.

23. A device as claimed in claim 22 and wherein the generally semi-circular portions of the apertures in the ridges of one member are to one side and the generally semi-circular portions of the apertures in the ridges of the relatively inverted member are to the other side, as viewed in the direction of passage of said tubing through the valley.

24. A device as claimed in claim 23, wherein the length of tubing, when undeformed, is of substantially constant circular section through the pumping device, the curvature of the generally semi-circular portions of the apertures in the ridges of both members are normally such that in one position of relative movement of the two members, the generally semi-circular portions of the apertures in the ridges of the two members together form a passage of substantially circular cross-section of diameter closely similar to that of said tube.

25. A device as claimed in claim 24 and wherein said formed passage is of diameter slightly less than that of said tubing whereby gently to nip said tubing.

26. A device as claimed in claim 14 and wherein one of said two members is arranged to be stationary during operation whilst the other moves in the manner of a shuttle.

27. A device as claimed in claim 26 and wherein said member which is arranged to move in the manner of a shuttle is arranged to be driven via an eccentric by an electric motor which is controlled to move in operation in a series of discrete steps producing incremental steps of said member in a direction producing deformation of said tubing.

28. A device as claimed in claim 27 and wherein said member which is arranged to move in a manner of a shuttle is arranged to be returned by said motor in the opposite direction in one relatively rapid movement.

29. A device as claimed in claim 26 comprising a housing with a closure, such as a door or lid and wherein the member which is arranged to be stationary during operation is carried by said closure whereby opening said closure releases said tubing from said deforming means.

30. A device as claimed in claim 29 and wherein the member which is arranged to be stationary during operation has limited freedom to move, independent of said closure, towards and away from said other member, biassing means being provided between it and said closure tending to urge it towards said other member.

31. A device as claimed in claim 29, wherein each valve means comprises a guide member having a channel therethrough for said tubing and, within said channel, a rotary member having an off-centre projection extending generally parallel to the axis of rotation of said rotary member and having one face against which said tubing lies, the arrangement being such that said face defines, in part, said channel and partial rotation of said rotary member causes said tubing to be occluded by the resultant action of said face upon said tubing; wherein operator controllable means are provided for causing the rotary members of both valve means to rotate to a position in which the faces of said projections are so aligned with the tubing and the squeezing means is so relaxed as to permit the tubing to be removed from said channel and wherein said operator controllable means comprises a control accessible to an operator only when said closure is open and operable after the sequence of operations consequent upon opening said closure, as described above, is complete.

32. A device as claimed in claim 29 and wherein opening said closure is arranged to cause both valve means to be set to conditions restricting the flow of liquid.

33. A device as claimed in claim 32 and wherein opening said closure is arranged to cause both valve means to be set to conditions restricting the flow of liquid and thereafter to cause the moving member of said deforming means to be returned to a position of minimum deformation of said tubing.

34. A device as claimed in claim 33 and wherein the arrangement is such that closing said closure causes the moving member of said deforming means to be driven to its extreme position of movement in a direction deforming said tube with the valve means on the outlet side in a condition of restricted flow and the valve means on the inlet side in a condition of increased flow and thereafter indexed back, with both valve means remaining in the conditions just mentioned, to a predetermined start whereafter the means on the inlet side is set to a condition of restricted flow and the valve means on the outlet side is set to a condition of increased flow position and the cycle of operation of said deforming means and valve means is commenced.

*35. A pumping device comprising:*

*means for accommodating a length of tubing providing, in operation, passage for liquid through said device,*

*means for deforming said tubing whereby to reduce its volume, and*

*controllable valve means including independently controlled valve actuators provided adjacent opposed sides of said deforming means for restricting the flow of liquid through said tube,*

*wherein said deforming means comprises members arranged for controlled relative movement in opposed directions which extend transversely to the direction of liquid passage within said tubing, said members adapted to engage said tubing between said actuators, whereby said tubing is first deformed in one transverse direction and then in the opposed transverse direction which tends to restore the original cross-sectional shape of said tubing, and*

*control means for controlling said valve actuators to open and close in synchronism with deforming of said tubing so that liquid is displaced from an outlet side of said tubing as a function of change of volume of the tubing during deformation.*

*36. A pumping device comprising:*

*means for accommodating a length of tubing providing, in operation, passage for liquid through said device,*

*means for deforming said tubing to reduce its volume locally,*

*inlet and outlet independently controlled valve means provided adjacent opposed sides of said deforming means for restricting the flow of liquid through said tubing, and*

*control means arranged to control the operation of said deforming means and said valve means such that at times when said tubing is being deformed by said deforming means to reduce the volume of liquid locally, the inlet valve means is in a condition of restricted flow whilst the outlet valve means is in a condition of increased flow and liquid is thereby displaced from an outlet of the tubing and at times when said volume is being locally restored the outlet valve means is in a condition of restricted flow whilst the inlet valve means is in a condition of increased flow, and*

*wherein said deforming means comprises members arranged for controlled relative movement in opposed directions which extend transversely to the direction of liquid passage within said tubing, said members adapted to engage said tubing between said actuators, whereby said tubing is first deformed in one transverse direction and then in the opposed transverse direction which tends to restore the original cross-sectional shape of said tubing.*

* * * * *